Dec. 19, 1944.  L. B. GAMEL  2,365,404
TIRE SPLITTING MACHINE
Filed April 1, 1944  4 Sheets-Sheet 2

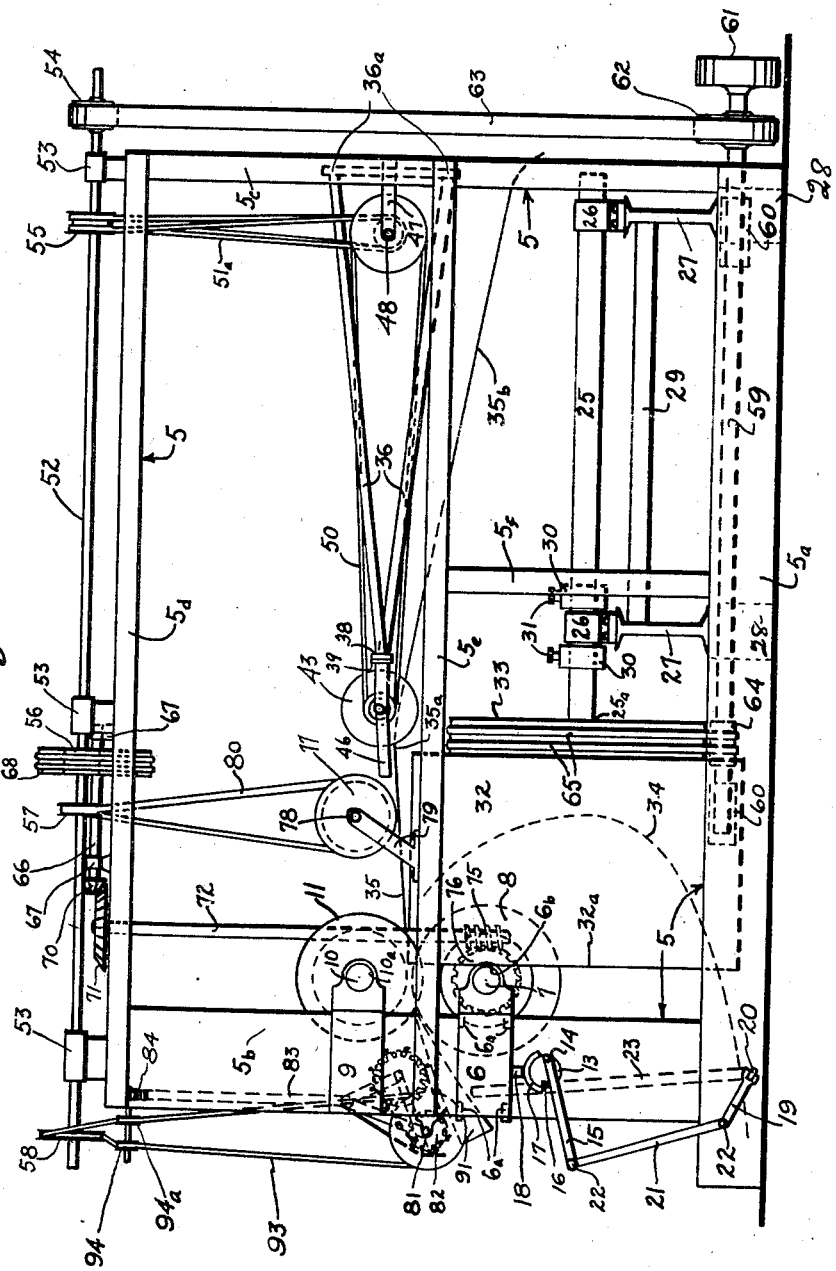

INVENTOR.
Lee B. Gamel
BY
A. E. Fisher
Atty

Dec. 19, 1944.  L. B. GAMEL  2,365,404
TIRE SPLITTING MACHINE
Filed April 1, 1944   4 Sheets-Sheet 3

INVENTOR.
Lee B. Gamel
BY
ATTY

Dec. 19, 1944. L. B. GAMEL 2,365,404
TIRE SPLITTING MACHINE
Filed April 1, 1944    4 Sheets-Sheet 4
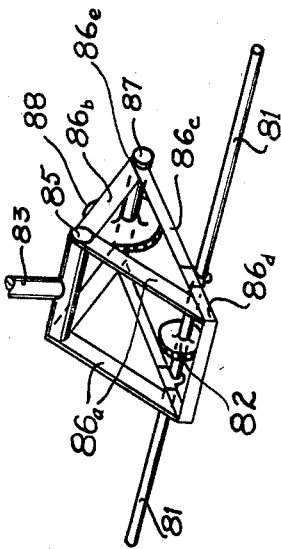
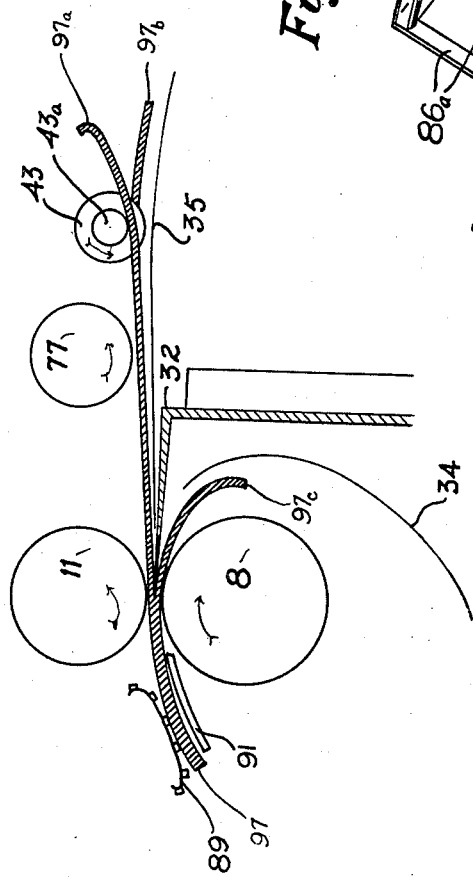
INVENTOR.
Lee B. Gamel
BY Patented Dec. 19, 1944

2,365,404

UNITED STATES PATENT OFFICE 2,365,404

TIRE SPLITTING MACHINE

Lee B. Gamel, Lemay, Mo.

Application April 1, 1944, Serial No. 529,218

12 Claims. (Cl. 164—61)

This invention relates to machines for cutting or peeling the outer rubber treads and beads from the inner fabrics or "carcasses" of automobile and truck tires or casings, the two operations or cuts being performed simultaneously, or separately and independently, as may be desired.

It is an object of the invention to provide a relatively simple, compact and efficient machine for the specified purposes, and which will quickly and accurately cut or shear off the rubber treads and the lateral beads from the fabrics or carcasses of the tire casings, with means for delivering the treads and beads at one end of the machine and the fabrics or carcasses at the opposite end of the machine.

A further object of the invention is to provide in a machine of the kind referred to, means for feeding the transversely parted casing of a tire endwise and relatively flatly to the cutting or shearing mechanism, and for holding the casing firmly in position against lateral movement or slippage while the treads and beads are being cut off from the inner fabric, thereby ensuring smooth and accurate work.

Another object of the invention is to provide a machine of the kind referred to, including means for adjusting the thickness or depth of the cuttings, or in other words for accurately aligning the lines of demarcation between the treads and the inner fabrics to the cutting knife of the machine, and along which lines of demarcation the cuttings are to be made.

Another object of the invention is to provide in a machine of the kind referred to, a suitably elongated supporting frame, comprising spaced side members positioned vertically in spaced and parallel relation, a feed roller journaled transversely in the lower portion of the frontal end of the frame, a press roller journaled immediately above the feed roller, a cylindrical cutting knife or drum rotatably mounted rearwardly or inwardly of the feed and press rollers upon a shaft journaled in the frame perpendicularly to the vertical planes passed axially through the feed and press rollers, the uppermost point of the knife being adjusted slightly above the medial, horizontal and longitudinally extended line passed over the uppermost point of the feed roller, means for adjusting the feed roller vertically to accommodate it to the depth of the tread cut to be made, means for feeding the parted casing endwise in between the feed and press rollers, and means for cutting off the lateral beads of the casing simultaneously with the cutting of the treads.

With the foregoing objects in view, together with such other and further objects and advantages as may appear from the specification, attention is directed to the accompanying drawings as exemplifying a preferred embodiment of the invention and structural features thereof, and wherein Figure 1 is a right hand side elevation of the machine.

Figure 7 is a schematic lay-out in side elevation and on the scale of Figure 1, of the feed roller, press roller, secondary press roller, cylindrical cutting knife (shown in section), circular bead cutter knives and attached traction rollers for traversing the beads and pulling same rearwardly, and showing in section a tire casing in process of passing through the machine for shearing the upper tread from the inner fabric.

Figure 8 is a perspective view on an enlarged scale of the feed mechanism, the sprocket chain however being omitted from this view.

Figure 2:
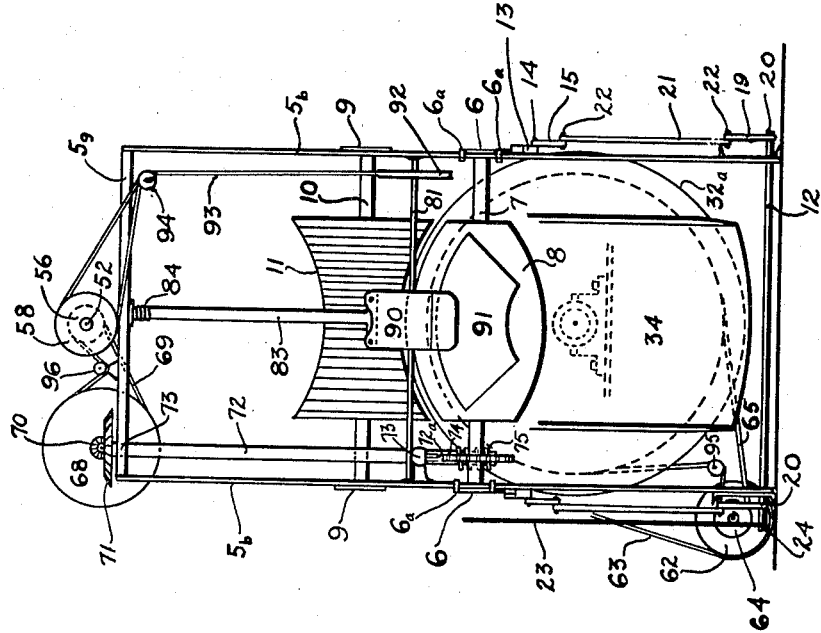
Figure 2 is a front end elevation of the machine.
Figure 5:
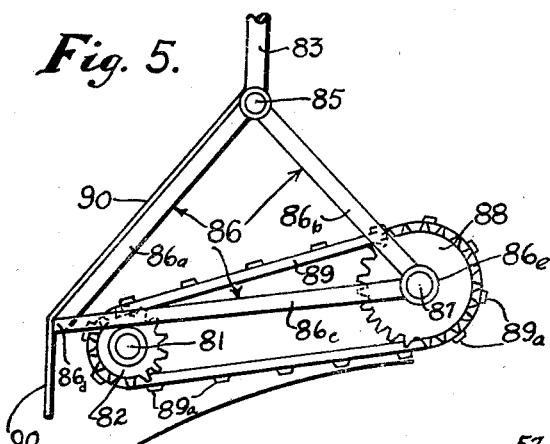
Figure 5 is a detail view, on an enlarged scale of the feeding mechanism of the machine, same being shown in side elevation.
Figure 6:
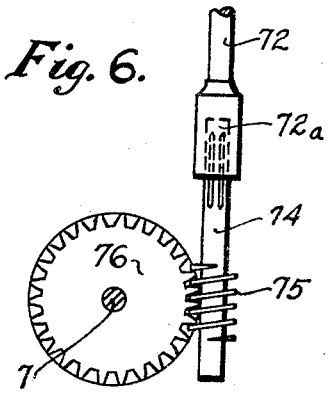
Figure 6 is a detail view on an enlarged scale, of the worm and worm wheel drive for the feed roller of the machine.
Figure 4:
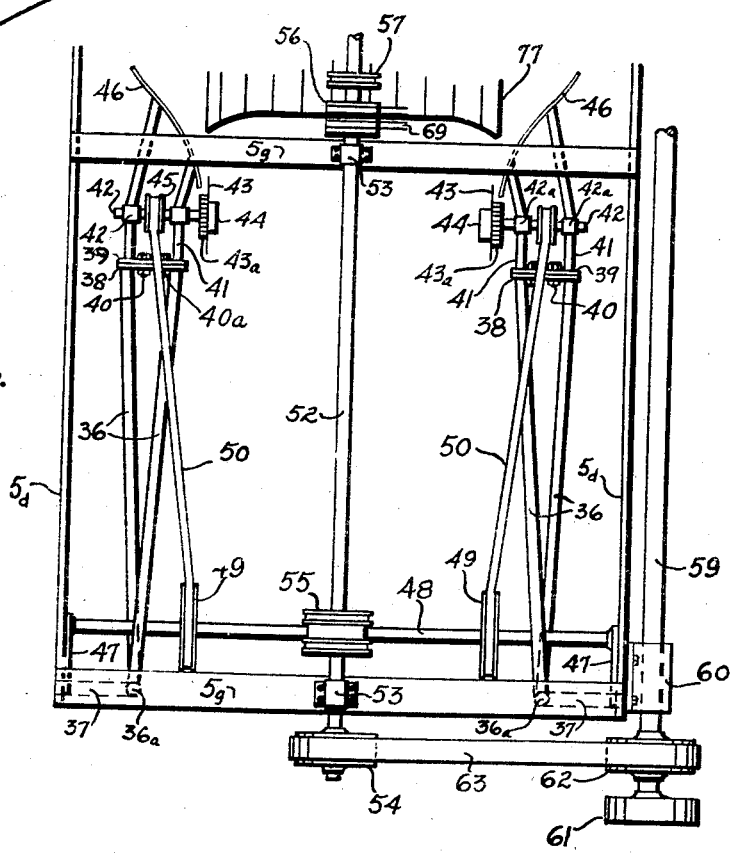
Figure 4 is a top plan view of the rear section of the machine.

A machine as constructed in accordance with this invention includes a suitable, rectangular supporting frame, such as here represented generally at 5, the same comprising a pair of side frames, wherein each includes a base sill 5a, the forward and rear uprights 5b, 5c, the top bars or rails 5d, the medial reinforcing braces 5e, and the medial brace posts 5f, all of which elements are transversely aligned as between the two side frames, or members, and being rigidly anchored together at their meeting ends or portions to complete the said rectangular structure. These said side frames are positioned vertically in parallel spaced relation, and are so supported by means of a number of cross braces 5g. The frontal uprights 5b are flat in cross-section, with their widths disposed in parallel relation and in exact transverse alignment. A pair of flat bearing plates 6 are slidably mounted on the outer faces or sides of these uprights, and at the lower portions thereof, this mounting being made through the expedient of striking tabs 6a (Fig. 2) from the upper and lower margins of the plates and turning these tabs inwardly over and around the lateral, vertical margins of the uprights 5b However the inner ends of these plates are extended inwardly beyond the inner margins of the said uprights and are formed or pierced with the circular apertures 6b for receiving the ends of a feed roller shaft 7, which is journaled through said apertures.

An ellipsoidal or circumferentially convexed feed roller 8 is rigidly mounted upon this shaft 7, between the two frontal uprights 5b, this said roller being perfectly round upon any diametrical cross-section, but tapering regularly and gradually from its center portion towards each end, these ends themselves however being formed straightly across as shown. The feed roller 8 is formed of relatively rigid and unyielding material, and may be made solid or hollow as preferred, and may be anchored to its shaft in any conventional manner.

A similar transversely aligned pair of flat bearing plates 9 (Fig. 1) are fixedly anchored to the uprights 5b, in spaced relation above the plates 6, and a press roller shaft 10 is journaled at its ends through the annular apertures 10a formed through these plates at their inner extended ends. A press roller 11 is rigidly mounted upon the shaft 10, this roller being of approximately the same length as the feed roller 8, and being formed circumferentially concaved and surfaced complementally to the convexed surfacing of the feed roller 8. The press roller 11 is preferably constructed of some resilient material such as rubber, for a purpose later to be explained, and this feature of construction may be accomplished in any conventional manner. As mounted upon their said shafts, the two rollers 8 and 11 stand normally slightly spaced apart, and with their axes lying in a common vertical plane, but the spacing between these rollers may be increased or diminished to a degree, by means of the adjustment mechanism now to be described. For this purpose a cam operating rod or shaft 12 (Fig. 2) is journaled transversely through the frontal ends of the base sills 5a, and circular cams (Fig. 1) indicated at 13, are eccentrically pivoted to the outer sides of the frontal uprights 5b, immediately below the bearing plates 6, by means of pivot pins 14 passed freely through the margins of the cams and fixedly anchored at their ends in the said uprights. These pins 14 are extended outwardly and pass fixedly through the inner ends of the upper cam operating levers 15 which extend angularly forward and bear up against the under sides of stop pins 16, which are seated in the diametrically opposite margins of the cams, and horizontally outward from the pins 14. Arcuate shoes 17 are anchored atop the cams 13, and short lugs 18 are rigidly depended from the lower margins of the bearing plates 6 with their lower ends slidably seated upon the shoes 17. Lower cam operating levers 19 are rigidly keyed at their inner ends, as shown at 20, to the outer extended ends of the cam operating rod or shaft 12, and are extended outwardly in vertical alignment with the upper levers 15. Connecting rods 21 are pivotally pinned as at 22 to the outer ends of the levers 15 and 19. Thus rotation of the rod 12 inwardly at its top-most side will force the levers 15, 19 upwardly, causing the cams 13 also to turn inwardly and raise the shoes 17 and the bearing plates 6, thus regulating and adjusting the spacing between the feed and press rollers 8, 11, as may be required in practice. A hand lever 23 is keyed at its lower end to the left hand end of the rod 12, as indicated at 24, and by rocking this lever forward or backward, the rod or shaft 12 will be oscillated for lowering or raising the feed roller 8 for adjusting the spacing of the rollers 8 and 11, as above referred to.

A heavy drive shaft 25 is extended medially and longitudinally through the lower and rear portion of the frame 5, being journaled through bearings 26 seated rigidly upon the posts 27, which are in turn rigidly seated and supported upon the base cross beams or sills 28 connected at their ends to the sills 5a. The posts 27 may be reinforced by means of a connecting bar or brace 29, secured at its ends to the posts. The shaft 25 is also slidable longitudinally through its said bearings, and may thus be adjusted lengthwise to any desired setting, by means of the adjustment collars 30 slidably mounted at each side of the frontal bearing 26 and adjustably securable in place upon the shaft by means of set screws 31. However, any other conventional means for the lengthwise adjustment of the shaft 25 may of course be employed, and if desired roller thrust bearings may be incorporated between the bearing 26 and the collar 30, these being in conventional form and not here shown. This lengthwise adjustability of the shaft 25 is necessary in order to compensate for wear upon the forwardly disposed cutting edge of the cylindrical knife 32 now to be described. The heavy cylindrical knife 32 is hollow and open throughout its forward portion, and is sharpened entirely around its forward edge as indicated at 32a. The rear end of this cylindrical knife is closed by means of an outwardly projected pulley wheel 33, the diameter of which is substantially reduced relative to the diameter of the knife proper, so as to provide clearance space for a drive belt, later to be referred to. The pulley wheel 33 is rigidly and concentrically anchored to the body of the knife, as indicated at 25a. The cylindrical knife 32 as thus formed and equipped is rigidly and concentrically mounted upon the forward end of the shaft 25, with the axes of these elements coinciding. With the said knife thus mounted, the dimensioning, positioning and arrangement of the elements are such that the forwardly disposed and sharpened edge 32a of the knife will fall just slightly above a line drawn horizontally tangent to the center of the feed roller 8 when this roller is in its lowermost position, and slightly rearward of a plane passed vertically through the axis of that roller, this positioning being found by experiment to be best adapted for the proper functioning of the machine in use, for splitting off the treads from the tire casings.

Figure 3:
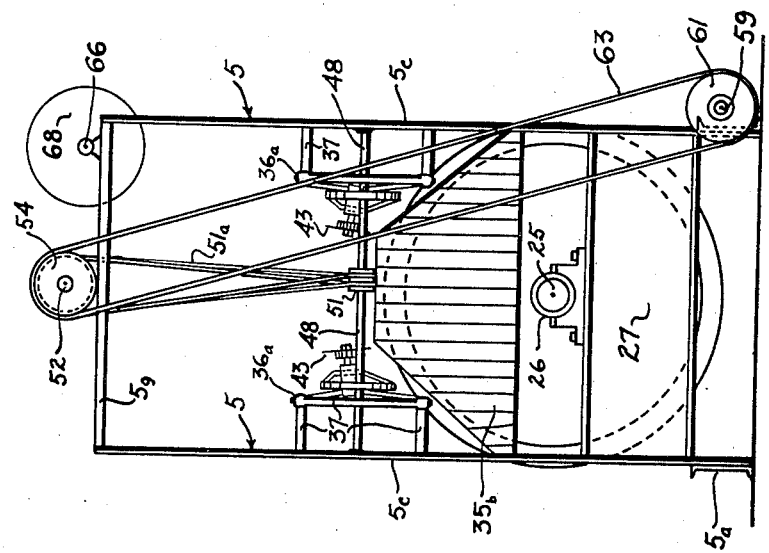
Figure 3 is a rear end elevation of the machine.

A curved chute 34 is mounted in the front of the machine immediately below the feed roller 8, and rearwardly thereof, and this chute has its rear portion curved and extended partially within the hollow cylindrical knife 32, with the lower side of the chute turned outwardly as shown (Fig. 1). This chute is designed for catching the fabric portions or "carcasses" of the tire casings and delivering them outwardly to the front of the machine, as the same are cut from the treads in manner later to be pointed out. A receiving table 35 is mounted rearwardly of the rollers 8 and 11, the same being suitably supported in the frame in any conventional manner, and this table extends rearwardly substantially horizontal from a point immediately over the uppermost point of the knife 8 back of the press roller 11, to a point 35a, whence it turns and slopes downwardly and rearwardly and flares laterally as indicated at 35b (Figs. 1 and 3) to serve as a rear chute for catching and delivering the tread portions of the casings to the back of the machine, as the knife cuts same from the casings.

At each side of the rear end of the machine a pair of bead cutter operating arms 36 are pivotally supported from elongated and vertically extended brackets 37, which brackets are mounted medially and rigidly upon the inner sides of the rear uprights 5c of the frame 5, and are turned inwardly in a common plane. For the purpose of such mounting of the arms, the rear ends of each pair of arms at each side, are pivoted one to the upper and the other to the lower end of said brackets, as indicated at 36a. From these points of pivotal support on said brackets, the pairs of arms 36 at each side extend horizontally forward in substantially parallel relation, and their forward ends are spread laterally apart and are rigidly joined to the flat abutment plates 38. Flat adjustment plates 39 are adjustably or rotatably pivoted to the plates 38 by means of bolts 40 passed centrally through the two plates at each side. The outer bolts 40 are the pivot bolts proper, and the inner bolts 40a are the adjustment bolts or lock bolts which extend through arcuate slots in the plates 39, in a conventional manner and not here shown, and whereby the plates 39 may be partially rotated for adjustment purposes later to be described. At each side of the machine a pair of cutter bearing rods or bars 41 are joined laterally to and extended forwardly from the plates 39, in a laterally spaced relation conformably with the spacing of the forward ends of the arms 36 where joined to the plates 38. Stub cutter shafts 42 are journaled as at 42a transversely atop these rods 41, in transverse alignment. The inner ends of the shafts 42 are extended, and circular bead cutter knives 43 with attached toothed traction rollers 43a of lesser diameter than the knives, are rigidly secured upon said inner ends of the shafts by means of nuts 44 turned upon these threaded ends. In this assembly the knives 43 are disposed inwardly of the rollers 43a. The purpose of these units will be later explained.

Pulley wheels 45 are rigidly keyed upon shafts 42 between the rods 41. These rods 41 are extended forwardly of the shafts 42 and are turned inwardly for supporting at their forward ends the cutter gauge guides or wings 46 which are rigidly joined to the ends of the rods and flare outwardly, as shown, for a purpose to be explained later.

Brackets 47 are rigidly joined to and extended forwardly from the rear uprights 5c, intermediately of the vertically pivoted rear ends of the arms 36, in transverse alignment, and a power transmission shaft or counter-shaft 48 is journaled at its ends in these brackets. Pulley wheels 49 are rigidly keyed upon this shaft and are spaced inwardly from the said pivotal mounting of the rear ends of the arms 36, and also somewhat inwardly of the pulleys 45, and belts 50 are tautly trained over these pulleys. Thus, due to the relative inward positioning of the rear pulleys 49 and the tautness and pull of the belts 50, the tendency of the forward pulleys 45 is to swing inwardly, carrying with them of course the bead cutter knives 43 and traction rollers 43a, for a purpose to be explained. A power transmission pulley 51 is keyed medially upon the shaft 48.

An overhead transmission shaft 52 is journaled medially and longitudinally over the top of the frame 5 from end to end thereof, through bearings 53 anchored upon the upper cross braces 5g. Pulleys 54, 55, 56, 57, 58, are keyed respectively to the rear end, to the medial portions and to the front end of the shaft 52, for purposes to be described. A power drive shaft 59 is journaled through bearings 60 anchored to and extended laterally from the left hand side or base sill 5a, and a power drive pulley 61 is keyed to the rear end thereof, while a power delivery pulley 62 is keyed to the same shaft inwardly of the pulley 61, in working alignment with the rear pulley 54 of the shaft 52. A belt 63 then connects these pulleys. Power may be applied to the drive pulley 61 in any conventional manner, for operating the mechanisms of the machine. A pulley 64 is keyed to the forward end of the shaft 59, in working alignment with the pulley 33 which operates the cylindrical knife 32, and a belt 65 connects these two pulleys for rotating the said knife. A counter shaft 66 is journaled at 67 on the left hand top rail 5d, and a pulley 68 is keyed thereon in alignment with the pulley 56 on the shaft 52. A belt 69 connects these two pulleys. The forward end of the shaft 66 carries a bevel gear 70 which meshes with a larger bevel gear 71, or speed reducing gear, keyed at the upper end of a vertical shaft 72 journaled at 73 upon the frame 5. The lower end of this shaft is bored into longitudinally and grooved, as indicated at 72a, for slidably receiving the complementally sized and splined worm shaft 74, carrying the worm 75 which engages the toothed periphery of a worm wheel 76 keyed at that adjacent end of the feed roller shaft 7, whereby that shaft and the feed roller 8 mounted thereon are rotated in the operation of the machine. This splined and resulting slidable engagement of the worm shaft 74 with the upper shaft 72 enables the vertical adjustment of the feed roller 8, through the manipulation of the hand lever 23, in manner already pointed out. When this feed roller is thus set to its proper adjustment relative to the upper press roller 11, for making the proper depth of cutting for exactly and nicely splitting the tread portion of the tire casing from its inner fabric or carcass, then the lever 23 may be releasably clamped or locked to its set position, in any conventional manner.

A secondary press roller 77 is journaled rearwardly of the press roller 11, between the roller 11 and the bead cutter knives 43, being mounted upon a shaft 78 journaled transversely in aligned brackets 79 seated upon the medial braces 5e of the frame 5, immediately upon the pulley 57 of the shaft 52. This roller 77 is somewhat concaved medially and circumferentially, similarly to the frontal and main press roller 11, and is operated by means of a belt 80 trained over the pulley 57 and medially over the said roller, the arrangement of the elements being such as to slightly and operatively space the roller above the receiving table 35. A shaft 81 is journaled transversely between the forward ends of the medial braces 5e, forwardly of the rollers 8 and 11, and a sprocket wheel 82 is rigidly and centrally keyed thereon. A lever 83 is resiliently connected at its upper end to an expansion spring 84 which in turn is secured at its upper end to the upper frontal cross-brace 5g. The lower end of the lever 83 is pivotally connected at 85 with a triangular frame 86 which comprises three pairs of spaced and transversely aligned branches or links 86a, 86b and 86c, the links 86a, 86b, extending one forwardly and the other rearwardly and joined at their upwardly meeting ends pivotally to the end of the lever 83, as stated. The lower and horizontally extended links 86c comprise a pair of flat bars extended in parallel spaced relation, as stated, and connected as at 86d to the sides of the lower ends of the forward links 86a, the rear ends of these bars as well as the lower ends of the links 86b being anchored to bearing rings 86e. A stub shaft 87 is journaled through the bearing rings 86e, and another sprocket wheel 88 is keyed on this shaft and is thus operatively seated between the side bars of the links 86b and 86c. A sprocket wheel 89 is trained over the sprocket wheels 82 and 88, this chain being provided at its under side with a series of spaced and outwardly turned traction lugs 89a. A flat shield 90 is secured at its upper margin upon the forward links 86a of the frame 86 and extends laterally at either side thereof, the forward and lower margin of this shield being turned downward as at 90a, over the forward sprocket wheel 82, for the protection of the operator as he feeds material into the machine. A frontal work receiving table 91 is rigidly and transversely mounted at the forward end of the machine, over the upper and frontal side of the feed roller 8, and underneath the sprocket feeding mechanism just described. By pulling outwardly upon the lever 83 the feeding mechanism as described may be raised from the table 91 for the purpose of inserting the parted end of a tire casing, in manner later to be described.

A pulley 92 is keyed upon the right hand end of the shaft 81, and a belt 93 is extended over and from the frontal pulley 58 of the shaft 52 and thence over the idle pulley 94 supported from the frame 5, and thence over the said pulley 92, the belt being returned over the pulley 94a supported from the frame 5 rearwardly of the pulley 94. The pulleys 94 and 94a are journaled upon a shaft 98 extended from the upper part of the frame 5. Tensioning rollers 95 and 96 are provided for the belts 65 and 69, the same being supported from adjacent parts of the frame 5 in conventional manner. The belt 93 thus serves to rotate the shaft 81, and that shaft in turn operates the sprocket wheel 82 and associated devices of the feeding mechanism, the sprocket 82 being rotated to cause the chain 89 to move rearwardly at its lower side, for feeding the work into the machine and to the knife. The pulley 51 of the shaft 48 is powered by means of a belt 51a which is trained over the pulley 55 as mounted on the shaft 52.

It is to be noted that by virtue of the pivotally adjustable connection of the plates 38 and 39, afforded by the bolts 40 passed therethrough, the forwardly extended bearing rods 41 and the bead cutter knives 43, as supported at the forward ends of the bead cutter arms 36, may be tilted laterally, towards or from the vertical, as may be found desirable in the operation of shearing off the rubber beads from the tire treads or casings.

All the parts of the machine, including the feed and press rollers, the cylindrical cutting knife, the drive shafts, and the power transmission pulleys and belts, are of course properly and relatively dimensioned so as to co-operatively function to produce the required results, and to operate at the most effective speeds, the feed and press rollers and the bead cutter knives being adapted to rotate at rather slow speeds and so as to draw and feed the work inwardly and rearwardly of the machine. In the operation of the machine and with the power turned on for operating the several working parts thereof, the tire casing 97, as removed from its wheel, is cut through and parted transversely, and one end thereof with the tread side uppermost and the carcass side of plied cordage or fabric lowermost, is thrust underneath the feeding mechanism, which mechanism is raised for this purpose by pulling outwardly upon the lever 83, as heretofore pointed out. In this operation the work of course passes over the outer table 91. The feeding mechanism being then again lowered, the casing is pressed down upon the table and is engaged by the feed chain 89 and traction lugs 89a thereof, which feed the casing between the feed and press rollers 8 and 11 and endwise to the cutting edge of the cylindrical knife 32, this cutting edge 32a having beforehand been properly adjusted to the work, by the expedient of raising or lowering the feed roller 8 in manner already explained, and so as to make the cut or split between tread and carcass of the desired depth.

As before stated the press roller 11 is preferably made of some resilient material, because such resiliency facilitates the gaging of the depth of the cut by absorbing the upward pressure of the feed roller. Such resiliency of the press roller also serves to frictionally grip the tire casing and tread, and prevent same from slipping laterally from its central line of travel between the rollers. As the knife splits the upper tread, indicated at 97a—97b, from the casing, this tread portion passes rearwardly up over the inner table 35, underneath the secondary press roller 77, which functions for holding the tread portion against lateral slippage. The advancing end of the tread portion after passing under the roller 77, now impinges at each side the cutter guides or wings 46, which as stated are arranged to normally swing inwardly towards one another, and these guide wings are thus forced asunder commensurately with the width of the tread, and so that when the end of the casing arrives at the circular bead cutter knives 43 and the traction rollers 43a, these rollers will engage and ride upon the outer beads 97a of the casing, while the circular knives 43 will shear off these beads simultaneously at either side. After the tread and beads are thus severed from the carcass, these portions pass rearwardly down the delivery chute 35b, and at the same time the carcass portion 97c turns downward from the cutting knife, into the curved chute 34, for delivery at the front of the machine. As above stated the lateral tilt of the knives 43 may be adjusted as desired for severing the beads 97a from the central treads 97b of the casing 97.

It is to be noted that the longitudinal curvatures from end to end and in a common axial plane, of the peripheries of the feed and press rollers 8 and 11, are exactly complemental, the one being a convexed line and the other a concaved line, and are also complemental to the cutting edge 32a of the cylindrical knife 32, so that a line extended intermediately of the rollers 8 and 11 in a common axial plane of these rollers, would exactly register with the said cutting edge 32a of said knife, and so that the latter would nicely and regularly sever the tread portions of a casing from the inner carcass.

The curvatures referred to in the peripheries of the feed and press rollers, as well as the corresponding annular cutting edge of the cylindrical knife, are necessary owing to the normal transverse curvature of a tire casing. While such curvature of the casing may be flattened to a great extent, and is so flattened in passing in between the feed and press rollers and under the secondary press roller preliminary to being presented endwise to the circular knife, still it is practically impossible to reduce the casing to a condition of absolute flatness at the end which contacts the knife. The best that can be done is to approximate such condition of flatness, and this is accomplished by means of the cylindrical knife and convexed and concaved rollers, as above described.

It is to be noted that if so desired for any purpose, as for instance in the making of repair boots for sealing casing blow-outs of tires, the adjustment of the feed roller relative to the cutting edge of the knife, may be so made that one or two or more plies of the fabric of the carcass may be sheared off with the outer tread, for forming such boots.

It is further to be noted that as the cutting edge 32a of the cylindrical knife 32 wears off through use, this cutting edge may be reformed and resharpened in any conventional manner, and the entire knife may then be adjusted and reset forwardly to compensate for such wear, by merely loosening the adjustment collars 30 on the shaft 25, then moving the shaft forwardly slightly as may be required, and then resetting the said collars.

It is thought that from the foregoing description and accompanying drawings, the construction and use of the machine will be fully understood, and while I have here shown and described a preferred embodiment of the invention and certain preferred structural features thereof, this specific embodiment and structural features as shown, may be varied as found desirable, within the scope of the claims.

I claim:

1. In a machine of the kind described, a supporting frame comprising frontal and rear portions, a drive shaft extended medially and longitudinally through the rear portion of the frame adjacent the base thereof and journaled in bearings supported upon the frame, a cylindrical hollow knife rigidly and concentrically mounted upon the forward end of the drive shaft, the forward annular edge of the knife being sharpened, an ellipsoidal feed roller journaled transversely of the forward end of the frame and forwardly of the said cylindrical knife, the peripheral surface thereof being convexed from end to end on planes passed through the axis thereof, the convexed curvature of the roller from end to end corresponding with the annular curvature of the cutting edge of the knife, the positioning of the feed roller relative to the knife being such that the uppermost point of the cutting edge of the knife will fall slightly above a straight horizontal line extended perpendicularly to a vertical plane passed through the axis of the roller and tangent to the uppermost point of the convexed surface thereof and rearward of the said vertical plane extended through the axis of the roller, a press roller journaled transversely of the frame above the feed roller with its axis in the said vertical plane of the axis of the feed roller, the said press roller being solid from end to end upon and around its superficial portions, and circumferentially concaved from end to end on planes passed through its axis, means for rotating the said cylindrical knife, and means for rotating the said feed roller to draw the work through between the feed and press rollers and present same to the rearwardly positioned cylindrical cutting knife.

2. In a machine of the kind described, a supporting frame comprising frontal and rear portions, a drive shaft extended longitudinally through the rear portion of the frame adjacent the base thereof and journaled in bearings supported on the frame, a cylindrical hollow knife rigidly and concentrically mounted on the forward end of the drive shaft, the forward annular edge of the knife being sharpened, an ellipsoidal feed roller journaled transversely in the forward end of the frame and forwardly of the said cylindrical knife, the peripheral surface thereof being convexed from end to end on planes passed through the axis thereof, the convexed curvature of this roller from end to end substantially corresponding with the annular curvature of the cutting edge of the knife, the positioning of the feed roller relative to the knife being such that the uppermost point of the cutting edge of the knife will fall slightly above a straight horizontal line extended perpendicularly to a vertical plane passed through the axis of the roller and tangent to the uppermost point of the convexed surface thereof and rearward of the said vertical plane extended through the axis of the roller, a press roller journaled transversely in the frame above the feed roller with its axis in the said vertical plane of the axis of the feed roller, the said press roller being circumferentially concaved from end to end on planes passed through its axis, means for rotating the said cylindrical knife, means for rotating the said feed roller to draw work through between the feed and press rollers and present same to the rearwardly positioned cylindrical cutting knife, and a feeding mechanism mounted at the front of the machine forwardly of the feed and press rollers, for engaging the work and directing same to the rollers.

3. In a machine of the kind described, a supporting frame comprising frontal and rear portions, a drive shaft extended longitudinally through the rear portion of the frame adjacent the base thereof and journaled in bearings supported on the frame, a cylindrical hollow knife rigidly and concentrically mounted on the forward end of the drive shaft the forward annular edge of the knife being sharpened, an ellipsoidal feed roller journaled transversely in the forward end of the frame and forwardly of the said cylindrical knife, the peripheral surface thereof being convexed from end to end on planes passed through its axis, the convexed curvature of this roller from end to end substantially corresponding with the annular curvature of the cutting edge of the knife, the positioning of the feed roller relative to the knife being such that the uppermost point of the cutting edge of the knife will fall slightly above a straight horizontal line extended perpendicularly to a vertical plane passed through the axis of the roller and tangent to the uppermost point of the convexed surface thereof and rearwardly of the said vertical plane extended through the axis of the roller, a press roller journaled transversely in the frame above the feed roller with its axis approximately in the axis of the said vertical plane of the axis of the feed roller, the said press roller being circumferentially concaved from end to end on planes passed through its axis, means for rotating the said cylindrical knife, means for rotating the said feed roller to draw work through between the feed and press rollers and present same to the rearwardly positioned cutting knife, a work receiving table at the front of the machine, and a feeding mechanism mounted above said table and arranged for raising to receive work thereunder, and when lowered again upon the work to engage same for directing it to the said rollers.

4. In a tire-casing splitting machine of the kind described, a supporting frame comprising frontal and rear portions, a drive shaft journaled longitudinally through the lower rear portion of the frame, a cylindrical hollow knife rigidly and concentrically mounted on the forward end of the drive shaft, an ellipsoidal feed roller and a complementally concaved press roller journaled transversely in the forward end of the frame forwardly of the knife, the press roller above the feed roller and the axes of the rollers lying in a common plane, the convexed and concaved lines of curvature of said rollers from end to end on their axial planes corresponding substantially with the annular curvature of the cutting edge of the knife, the said rollers being operatively positioned relative to the knife, a work receiving table at the front of the machine, and a feeding mechanism mounted above said table and adapted for raising to receive work thereunder, the said feeding mechanism being adapted when lowered again upon the work, such as a tire casing, to engage the same and propel it rearwardly into the machine, through the said rollers and towards the said knife.

5. In a tire-casing splitting machine of the kind described, a supporting frame of frontal and rear portions, a drive shaft journaled longitudinally through the lower rear portion of the frame, a cylindrical knife rigidly and concentrically mounted on the forward end of the drive shaft, a lower ellipsoidal feed roller and an upper and complementally concaved press roller journaled transversely in the forward end of the frame forwardly of and in co-operative relation to the knife, the convexed and concaved lines of curvature of the rollers from end to end on their axial planes corresponding substantially with the annular curvature of the cutting edge of the knife, whereby the knife is adapted to split the rearwardly traveling casing, severing the upper tread portion from the carcass, a receiving table mounted rearwardly of the upper press roller for receiving the said tread portion, and shearing means arranged above the table for shearing off the lateral beads of the tread portion as the same passes rearwardly over the table.

6. In a machine according to claim 5, said shearing means being automatically adjustable to accommodate treads of varying widths.

7. In a machine according to claim 5, a secondary press roller journaled transversely over the said receiving table for pressing the rearwardly moving tread portion to the table and holding it against lateral slippage, and the said shearing means being mounted rearwardly of the secondary press roller and being automatically adjustable through the width of the tread portion to receive and shear off the beads of tread portions of varying widths.

8. In a machine according to claim 5, the said bead shearing means including a pair of bead cutter operating arms pivotally mounted at their rear ends in the rear end of the frame, one at each side thereof and extended horizontally forward in a plane slightly above the said receiving table, these arms being so pivoted at their rear ends as to automatically tend to swing inwardly towards one another, knife supports extended from the forward ends of the said operating arms, circular bead cutter knives journaled on the forward ends of the knife supports and adapted to rotate in planes extended vertically and longitudinally through the machine, means for adjusting said knives more or less to the vertical, and bead cutter gauge guides rigidly supported upon the knife supports forwardly of the said knives and flared outwardly and forwardly, for receiving the advancing end of the tread portion of a tire-casing between them, and thus automatically adjusting the bead cutter knives to the width of the tread, for shearing off the beads at each side thereof.

9. In a tire-casing splitting machine, a supporting frame of frontal and rear portions, a drive shaft journaled longitudinally through the lower rear portion of the frame, a cylindrical knife rigidly and concentrically mounted on the forward end of the drive shaft, feed and press rollers journaled transversely in the forward end of the frame forwardly of and in cooperative relation to the cylindrical knife, whereby the knife is adapted to split the upper tread portion from the lower carcass of the rearwardly traveling casing as passed through between said rollers, a receiving table mounted rearwardly of the upper press roller for receiving the said tread portion, a pair of bead cutter operating arms pivotally mounted at their rear ends in the rear end of the frame at opposite sides thereof, the said arms being extended horizontally forward in a plane slightly above the said receiving table, these arms being so pivoted at their rear ends as to automatically tend to swing inwardly toward one another, knife supports extended from the forward ends of the operating arms, circular bead cutter knives journaled on the knife supports and adapted to rotate in planes extended vertically and longitudinally through the machine, means for adjusting the said knives more or less to the vertical, and bead cutter gauge guides carried by the knife supports forwardly of the knives, the said guides being flared outwardly and forwardly and thus adapted to receive between them the advancing end of the tread portion of the tire-casing and thereby to automatically adjust the bead cutter knives to the width of the tread for cutting off the beads at each side thereof, the said knives being operatively disposed above the said receiving table.

10. In a machine according to claim 9, traction rollers concentrically mounted on the outer sides of the bead cutter knives, and adapted to ride upon the beads of the tread portion of the tire-casing, for facilitating the operation of the knives.

11. In a machine of the kind described, for splitting a transversely parted tire-casing from side to side length-wise in layers, a suitable supporting frame including frontal and rear sections, a drive shaft journaled longitudinally through the lower rear section of the frame, a cylindrical hollow knife rigidly and concentrically mounted upon the forward end of the drive shaft, the forward annular edge thereof being sharpened as and for a cutting edge, means in the forward section of the frame for presenting and pressing the said casing with the tread portion uppermost, endwise to the uppermost margin of the cutting edge of the knife for splitting same as aforesaid, the leading end of the casing as presented to the knife being convexed upwardly to conform to the annular curvature of the knife, whereby the knife is adapted to curvedly spilt the rearwardly moving casing from side to side as stated, a receiving table mounted above the knife for receiving and passing the upper layers of the casing including the tread portion thereof as sheared off, a pair of bead cutter supporting arms pivotally and horizontally supported at their rear ends in the sides of the rear section of the frame in transverse alignment, said arms being extended forwardly in spaced relation laterally over the said receiving table, the pivotal supports of the arms being so arranged that the arms will tend automatically to swing towards one another centrally over the table, circular bead cutter knives supported and journaled at the forward ends of the said arms, and forwardly extended and outwardly flared guide wings carried by the supports of the circular bead cutter knives, said guide wings being arranged and adapted to engage the advancing upper layers of the casing as passing rearwardly over the table, and whereby the lateral spacing of the bead cutter knives is automatically adjusted according to the lateral spread of the tread portion of the casing for exactly shearing off the lateral beads from the said thread portion of the casing as the latter passes rearwardly under said knives.

12. In a machine according to claim 11, means for adjusting the setting of the said bead cutter knives more or less towards the vertical, as desired.

LEE B. GAMEL.